United States Patent [19]
Smith et al.

[11] 3,775,164
[45] Nov. 27, 1973

[54] METHOD OF CONTROLLING CRYSTALLIZATION OF GLASS

[75] Inventors: Sidney L. Smith, Elyria, Ohio; William A. Carlson, Rush, N.Y.

[73] Assignee: Sybron Corporation, Rochester, N.Y.

[22] Filed: May 10, 1971

[21] Appl. No.: 141,831

Related U.S. Application Data
[63] Continuation-in-part of Ser. No. 520,198, Jan. 12, 1966, abandoned.

[52] U.S. Cl............. 117/129, 117/135.1, 117/169, 65/33, 106/47
[51] Int. Cl...................... B32b 15/04, C03b 29/00
[58] Field of Search................ 117/129; 65/33

[56] References Cited
UNITED STATES PATENTS
3,389,458   6/1968   Ostrander et al................... 117/129
2,920,971   1/1960   Stookey ............................. 65/33 X

OTHER PUBLICATIONS
Little, Crystallized Glass Coatings; Materials Protection, Vol. 1, No. 6, June, 1962, pgs. 40–44.

Primary Examiner—Alfred L. Leavitt
Assistant Examiner—Basil J. Lewris
Attorney—Theodore B. Roessel

[57] ABSTRACT

In providing metal substrates with a protective coating of partially crystallized glass, crystalline refractory materials are added to the crystallizable glass frit to retard the rate of crystallization in order to maintain the coating in a substantially amorphous condition during the firing of the glass coating so that substantially all crystals in the partially crystallized coating are formed during subsequent heat treating.

4 Claims, 1 Drawing Figure

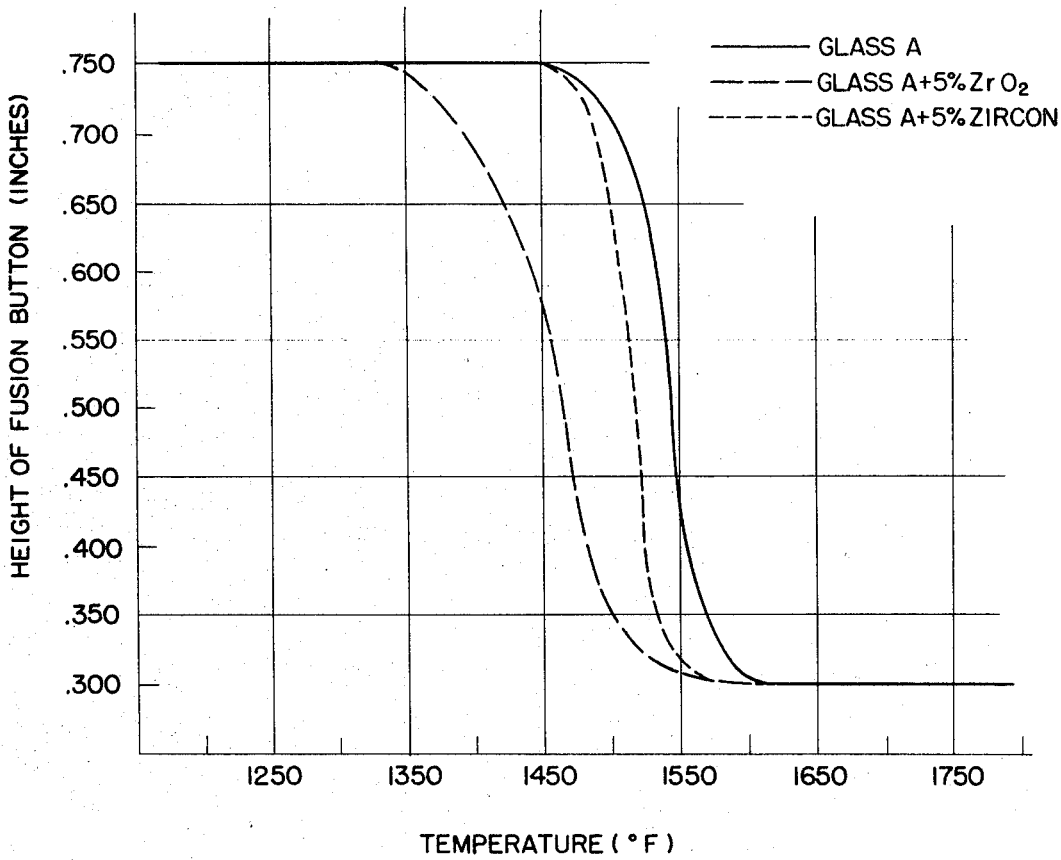

3,775,164

METHOD OF CONTROLLING CRYSTALLIZATION OF GLASS

RELATED APPLICATION

This application is a continuation-in-part of our co-pending application Ser. No. 520,198, filed Jan. 12, 1966, now abandoned.

BACKGROUND OF THE INVENTION

This invention relates generally to improved partially crystallized glass or vitreous enamel coated metal articles and particularly relates to a method for controlling the crystallization of devitrifiable glass or vitreous enamel coatings during their application to metal substrates.

It is well known to enamel or glass coat metal substrates to provide corrosion-resistant construction materials. A conventional method for applying glass coatings to metal substrates is to first smelt a suitable glass composition and quench the molten glass to convert it to a frit. As used herein, "frit" means a porcelain enamel frit as defined by the Ceramic Glossary, Emily C. Van Schoich, Ed., American Ceramic Society, Columbus, Ohio (1963); i.e., the small friable particles produced by quenching a molten glassy material.

The glass frit is usually subjected to a milling operation with water to form a paint-like slurry, (referred to as slip). The slip is then applied to the surface of the substrate by spraying, dipping or some other suitable method. The coating is then fired (heated) until it fuses and wets the substrate to form a protective coating. The steps of applying the slip and firing are usually repeated several times until the desired thickness of coating is obtained.

It has recently been proposed to increase the physical properties of glass-coated articles by partially crystallizing the glass coating. In the case of partially crystallized coatings, the frits are specially formulated to promote crystal growth. These crystallizable frits are usually applied to the metallic substrate in the amorphous or uncrystallized form. After the frit has been fused to form a continuous amorphous coating on the substrate, the coated article is heat treated at a temperature below the fusing temperature to cause the glass to nucleate and crystallize in situ, producing a partially crystallized coating.

When a crystallizable glass is heat treated, crystallization may be initiated by surface nucleation or by a combination of surface nucleation and internal nucleation. Surface nucleation occurs in any crystallizable glass because the free energy of the glass system is higher at the surface, which promotes orientation of the atoms into crystals. In most cases, contamination on the surface of the glass also provides numerous sites on the surface where crystal nucleation occurs. The effects of various impurities on surface nucleation are discussed by N. G. Ainslie, C. R. Morelock and D. Turnbull in their paper "Devitrification Kinetics of Fused Silica," General Electric Research Laboratory Report No. 61-RL-(2640M) (Revised), Schenectady, N.Y. (1961); which was also published in *Symposium on Nucleation and Crystallization in Glasses and Melts*, pp. 97–108, American Ceramic Society, Columbus, Ohio, (1962).

Some crystallizable glasses contain nucleating agents dispersed throughout the glass. In these glasses, crystallization is initiated by both surface nucleation and internal nucleation. Examples of glasses of this type are provided by U.S. Pat. No. 2,920,971 to Stookey.

Surface and internal nucleation and their relative roles in various glasses are discussed in the following articles, all of which are published in the above-mentioned *Symposium on Nucleation and Crystallization in Glasses and Melts* on the pages listed below.

S. D. Stookey, "Ceramics Made by Nucleation of Glass - Comparison of Microstructure and Properties with Sintered Ceramics," pp. 1–4.

W. Vogel and K. Gerth, "Catalyzed Crystallization in Glass," pp. 11–22.

S. M. Ohlberg, H. R. Golob and D. W. Strickler, "Crystal Nucleation by Glass in Glass Separation," pp. 55–62.

G. E. Rindone, "Crystal Orientation as Influenced by Platinum Nucleation," pp. 63–70.

W. B. Hillig, "A Theoretical and Experimental Investigation of Nucleation Leading to Uniform Crystallization of Glass," pp. 77–90.

The relative importance of surface and internal nucleation in any given application depends upon a variety of factors, including the composition of the glass, the size and shape of the article being treated and the method of heat treatment. In most cases where crystallized articles are produced by molding the article from molten glass and then devitrifying the glass, the composition and treatment are adjusted so that most of the crystallization is initiated by internal nucleation. In this manner, more even distribution of the crystals can be achieved.

In enamelling, however, surface nucleation plays a much more important part. Where the glass exists in a finely divided form as for application to a metallic base, each of the glass particles will begin to nucleate and to crystallize on the surface during the period when they are being heated to the fusion point for forming a continuous coating on the surface of the base metal. Moreover, as these glass particles approach the fusion temperature, they tend to "slump" or flatten out which increases the surface area to volume ratio as the particles depart further and further from spherical conﬁguration. During this period, the extended surface of the particle provides a large surface for the initiation of the crystallization. After the particles have coalesced to form a continuous coating, the large number of nuclei and crystals which have been initiated as described above are scattered throughout the body of the coating, thereby permitting crystallization to take place relatively quickly in order to produce a completely crystallized coating. In addition, even after the frit particles have been fused to form a continuous coating, grain boundaries between the individual frit particles still exist. These grain boundaries provide sites where additional surface nucleation can take place. Due to these grain boundaries and the nuclei and crystals produced during firing, additional crystallization occurs as subsequent coats are fired.

Firing temperatures and firing times for conventional amorphous glass coatings are determined to a large extent by the viscosity and the surface tension of the coating. That is, after the frit has been applied to the metal article, the article must be heated to a temperature which permits the glass to flow. Thus, the firing temperature must be high enough to permit the glass to flow and wet the substrate yet low enough to prevent damage to the metal substrate. The article is then maintained at the firing temperature for a period of time sufficient to permit the glass to flow over the surface of the article and fuse into a continuous coating. However, in the case of crystallizable enamel coatings, viscosity and surface tension depend not only on the composition of the enamel and the firing temperatures but also upon the crystallization characteristics of the coating. Thus, the coating of metal articles with partially crystallized glass presents several problems not encountered in the conventional practice of applying an amorphous coating to metal articles. For example, when firing some crystallizable coatings, much higher firing temperatures than would be anticipated based upon similar non-crystallizable coatings are necessary because of an increased refractoriness caused by crystallization during firing. In this respect, since the firing temperature of the coating exceeds the heat treating temperature, the very act of firing a crystallizable glass coating causes the formation of some crystals in the coating which is turn increases the refractoriness of the coating. Accordingly, a subsequent firing to deposit an additional layer of glass has to be conducted at higher temperatures in order to permit the additional layer to wet and fuse with the previous layer of glass. Furthermore, as each layer is fired, more crystals are formed in preceeding layers increasing the refractoriness still further and requiring successively higher temperatures for each firing. This steady increase in firing temperature for each layer often resulted in damage to the metal substrate. This places the enameller in the position of not being able to apply the coating at lower temperatures because of the refractoriness, and not being able to apply the coating at the higher temperatures because of possible damage to the metal substrate. It is thus the primary object of this invention to provide a method for controlling the crystallization of devitrifiable coatings without adversely affecting the thermal or physical properties of either the coating or of the metal substrate.

In view of the difficulties caused by premature crystallization it would obviously be desirable to inhibit the crystallization during the firing steps. However, if this inhibitive effect were to continue during the heat treating or crystallizing steps the basic purposes of crystallization would be thwarted. Therefore, another object of this invention is the inhibition of crystallization during the firing steps in a manner that will allow the crystallization to occur readily after the composite article has been formed.

It has been found that the improved physical and thermal properties of partially crystallized coatings are not only dependent upon the extent of crystallization but are also affected by the species and size of the crystals formed. For example, crystal phases or species such as cristobalite and zirconia, which undergo large phase transformations during heating and cooling, are detrimental to the physical properties of some coatings. Therefore, it is desirable either to eliminate the precipitation of these phases or to convert them to other non-detrimental forms such as quartz and zircon. Another object of this invention is to control the crystal specie to optimize physical properties.

Crystal size is important in that many small crystals, evenly distributed throughout the coating, provide enhanced thermal and physical properties over a coating containing few isolated large crystals. With respect to crystal size, it has been found that premature crystallization which occurs in the glass coating during heating to the firing temperature produced isolated crystals which grow during each successive firing and subsequent heat treating. Therefore, another object of the invention is to control the crystal size to optimize physical properties.

The prior art suggests that premature crystallization can be inhibited by increasing the firing temperature. This reduces the coating viscosity, effects flow and causes a continuous film to form. Although such an approach is useful for simple shapes for enameling purposes this is not generally feasible since premature crystallization is dependent not only upon temperature, but also upon heating rate, i.e., the faster the coating is heated, the less time the coating remains at the temperature at which crystallization occurs and the fewer are the number of crystals formed during firing. If the articles to be coated are of complex shape and varying thicknesses, the heating rates will be different over different areas of the coating. Consequently, heating the article to a firing temperature that will inhibit premature crystallization at the least conductive area of the article to be coated will result in the glass in the vicinity of the more conductive areas being subjected to higher temperatures for a period of time longer than they can endure in the glassy state and as a result becoming over-fired.

It has further been proposed to avoid uncontrolled devitrification of glasses by cooling the previously formed melt to arrest the formation of crystals. However, this procedure is not suitable for enameling large articles as the cooling rate is limited by the mass of the metal base rather than the glass melt and the maintaining of rigid heating and cooling cycles is, at best, difficult.

SUMMARY OF THE INVENTION

Briefly stated, we have found that the above problems can be overcome and the objects of this invention achieved by adding from 1 to 15% by weight of at least one crystalline refractory material selected from the group consisting of $SiO_2$, $Cr_2O_3$, $Al_2O_3$, $ZrO_2$, $ZrSiO_4$, $TiO_2$, $Li_2O \cdot TiO_2 \cdot SiO_2$, $Sb_2O_3$, $Ta_2O_5$, $WO_3$, $La_2O_5$ and $Fe_3O_4$ to a crystallizable, amorphous glass frit and milling the refractory material with the frit. The frit-mill addition mixture is then applied to the article by any of the conventional means and the article is fired and then heat treated to crystallize the glass.

DESCRIPTION OF THE DRAWING

The single FIGURE is a graph showing the relationship between fusion temperatures and compositions with and without mill additions according to the invention.

DETAILED DESCRIPTION

The frit used in the processes of this invention is produced by conventional enameling techniques. Glass forming materials are smelted to form molten glass, which is quenched to form a crystallizable amorphous glass frit.

One or more of the crystalline refractory materials listed above is added to the frit and the frit and refractory material are milled together to disperse the refractory material evenly. Conventional wet or dry milling techniques may be employed.

The frit-mill addition mixture is applied to the article to be enameled by conventional enameling techniques. The coated article is then placed in an oven, wherein the coating is heated to a temperature at least as high as the fusion temperature of the frit, but below the deformation temperature of the substrate. This fuses the frit and forms a coating of substantially amorphous glass having the crystalline refractory material incorporated therein. The steps of applying the frit-mill addition mixture and fusing the frit are repeated until a coating having the desired thickness is produced. Then the coated substrate is heat treated at a temperature below the fusion temperature of the frit to partially crystallize the amorphous coating and form a coating containing the crystals of the refractory mill additive and crystals formed in situ in the glass.

We have found that by the addition of these materials to the mill, premature crystallization may be inhibited, the specie of the crystal phase which precipitates may be controlled, and the properties of the crystallized coatings may be improved. These refractory material mill additions permit the crystallizable coating to be fired at temperatures which would cause premature crystallization in coatings not containing these additions. Moreover, by retarding crystallization, these additions to the coating permit processing of articles of various thicknesses without the adverse effects set out above, that is, these additions sufficiently retard crystallization so that an article of complex shape can be held at the firing temperature for longer periods of time without the formation of premature crystallization. We have also found that these additions permit a degree of control of crystal phase and crystal size not provided by prior art methods of producing crystallizable coatings. The lowering of the overall fusion point of glasses by the addition of refractory materials having higher melting points than the softening point of the glasses is anomalous and unexpected, because it is generally accepted practice to raise the firing temperatures of glasses by the addition of refractory oxides. Further, the inhibition of crystallization by the addition of crystalline materials to a glass frit is anomalous and unexpected, because crystals added to a glass would generally tend to increase, not decrease, the total crystal content of the glass. The unexpected nature of this result is further heightened by the fact that some of the oxides proposed for this invention are art-recognized as nucleating agents used for the express purpose of promoting crystallization.

The manner in which these refractory additives retard crystallization is not understood precisely. However, we do know that the additives retard surface nucleation but apparently have little or no effect on internal nucleation. Since some surface nucleation occurs in any devitrification process, the method of this invention may be used to retard crystallization in any crystallizable glass, including glasses that contain internal nucleating agents. A significant amount of surface nucleation takes place when internally nucleated glasses are used in enameling because of the high surface to volume ratio of the frit particles during firing and the grain boundaries that exist after firing.

Of course, since the additives retard surface nucleation but apparently do not retard internal nucleation, the overall amount of retardation achieved by the method of this invention is greatest if the frit does not contain an internal nucleating agent. As a result, it is usually preferable to use a glass wherein substantially all of the crystallization takes place at the surface or the grain boundaries of the frit particles in the processes of this invention. However, in some cases it is desirable to use an internally nucleated frit in order to produce a particular crystal structure. The use of this invention facilitates this because the refractory additives retard the surface nucleation, so that substantially all of the crystallization is attributable to internal nucleation.

EXAMPLE I

The following illustrates the marked effects that the present invention has in retarding crystallization during firing. A glass composition having the art recognized characteristics set out above, was smelted and quenched in water to form a frit. A specific glass composition selected for purposes of illustrating the present invention has the following weight percentages:

$SiO_2$ — 57.3%
$TiO_2$ — 8.8%
$Li_2O$ — 9.4%
$Na_2O$ — 6.9%
$SrO$ — 2.8%
$Al_2O_3$ — 9.7%
$Fe_2O_3$ — 5.1%

This glass contains 8.8% $TiO_2$, which is a well known nucleating agent. However, there is not enough $TiO_2$ to cause precipitation of the $TiO_2$ from the amorphous glass. Thus, internal nuclei do not develop in this glass and substantially all of the crystallization which occurs is attributable to surface nucleation. Strictly speaking, this composition should be classified as a glass that does not contain a nucleating agent, because the $TiO_2$ does not function as a nucleating agent in this glass.

The frit was divided into three equal portions labeled A, A-1, A-2. Each portion was separately milled and ground so that less than 10% was retained on a 20 mesh screen, each portion being milled with a mill mixture comprising for every 100 parts of frit, 6 parts of clay, 0.62 parts potassium chloride, 0.21 parts sodium nitrate and 40 parts of water. In addition, portion A-1 contained 5% Zirconia and portion A-2 contained 5% Zircon.

The three portions were formed into a plurality of cylindrical fusion buttons, of equal weight and approximately 0.750 inches in height. Samples of each portion were placed on a previously prepared "Inconel" plate and fired for 17 minutes at increasing temperatures.

The height of the fusion button VS temperature was plotted as illustrated by the single FIGURE. The ordinate of the graph is indicative of glass viscosity, e.g., the lower the fusion button height, the lower the viscosity at a given temperature.

It is apparent that the viscosity of Glass A is higher than that of the same composition with mill additions of zircon or zirconia. This is attributed to crystallization during heatup, which makes the glass more refractory and prevents flow until about 1,450°F. In contrast, the mill additions of zircon and zirconia inhibited crystallization and permitted the glass to flow at lower temperatures. This effect is even more pronounced when the time within which the samples reach temperature is lengthened.

The following specific examples will further illustrate the practice of the subject invention.

EXAMPLE II

Raw batch materials were dry mixed in amounts calculated to provide glass A having a weight per cent analysis of:

$SiO_2$ — 57.3
$TiO_2$ — 8.8
$Li_2O$ — 9.4
$Na_2O$ — 6.9
SrO — 2.8
$Al_2O_3$ — 9.7
$Fe_2O_3$ — 5.1

The resulting batch was smelted and then quenched in water to form a frit. The frit was then combined and milled with the following materials in proportions as follows:

Frit — 100
Clay — 6.0
Potassium Chloride — 0.62
Sodium Nitrate — 0.21
Water — 40.0
Zirconia — 15.0

A mild steel substrate was then sprayed with the resulting slip and additional frit powder consisting of 100 parts frit and 15 parts zirconia was dusted onto the still wet slip to build up the thickness of the coating and to prevent the wet slip from running.

The composite article was then heated to a temperature about 1,600°F. so that the viscosity of the glass reached $3 \times 10^4$ poises at which point it wet the substrate and flowed into a continuous protective layer.

An analysis of the glass indicated that at this point no appreciable crystallization had occurred.

Additional slip and frit powder were added and heated, as hereinbefore stated, until a satisfactorily thick layer of glass had been applied.

The resulting glass was then heat treated at about 1,450°F. for 1½ hours which caused it to crystalline partially.

Examples III – VI show that additions according to the invention reduce the total amount of crystals formed during the firing cycle.

In these Examples glass composition A (set forth above) was divided into five portions (A-3 thru A-7). Each portion was ground, milled and fused without a crystallization heat treatment in the same manner, except for mill additions as specified. All of the glasses were examined by x-ray diffraction using standard phase addition techniques. This is an art-recognized method for determining crystal specie and quantity. Glass A-3, which was a control sample without mill additions, upon analysis was found to contain 8.0% lithium titanium silicate (hereinafter referred to as LTS), 6.5% sodium aluminum silicate (hereinafter referred to as NAS) and 0.5% quartz.

EXAMPLE III

Glass A-4 similar to glass A-3 except for the mill addition of 5% $SiO_2$ contained less than 1.0% quartz and no LTS or NAS was detected.

EXAMPLE IV

Glass A-5 similar to glass A-3 except for the mill addition of 5% zircon contained 3.4% LTS, 1.7% NAS and no quartz was detected.

EXAMPLE V

In an analysis of glass A-6 similar to A-3 except for the mill addition of 15% $ZrO_2$, no LTS, NAS or quartz was detected.

EXAMPLE VI

Glass A-7 similar to A-3 except for the mill addition of 15% $TiO_2$ contained 2.2% LTS, 0.5% quartz and 1.0% NAS.

The following Table comparing the analysis of each of these glasses after fusing and prior to heat treatment shows that compositions similar in all respects except for mill additions according to the present invention display different quantities of crystals after firing.

TABLE I

CRYSTAL ANALYSIS AFTER FIRING AND BEFORE HEAT TREATMENT

| Sample | LTS (20.2°) | QTZ (26.7°) | NAS (27.7°) |
|---|---|---|---|
| A-3 (control) | 8% | 0.5% | 6.5% |
| A-4 (+5% $SiO_2$) | None | 1% | None |
| A-5 [+5% Zircon($ZrSiO_4$)] | 3.4% | None | 1.7% |
| A-6 (+15% $ZrO_2$) | None | None | None |
| A-7 (+15% $TiO_2$) | 2.2% | 0.5% | 1.0% |

Note that in each case, the quantity of LTS and NAS crystals formed in the control, Glass A, during firing greatly exceeds the quantity of the same crystals formed in the glasses containing mill additions according to the present invention.

In addition to the inhibition of crystallization during the initial fusing, mill additions as disclosed herein are useful for controlling the amount and specie of crystal present in the final product after the crystallization heat treatment.

The following Table (wherein Samples A-3 thru A-7 are the same as in Examples III thru VI) shows that compositions similar in all respects except for mill additions according to the invention, display different quantities and species of crystals when subjected to a crystallization heat treatment of 1,450°F. for 1½ hours. It was found that after a crystallization heat treatment, there appeared a marked increase in the quantity of crystals previously present together with a new crystal phase lithium silicate (hereinafter referred to as LS).

TABLE II

CRYSTAL ANALYSIS AFTER HEAT TREATING FOR ONE AND ONE-HALF HOURS AT 1450°F.

| Sample | LTS (20.2°) | QTZ (26.7°) | NAS (27.7°) | LS (18.9°) |
|---|---|---|---|---|
| A-3 | 6.6 | 0.8 | 14.0 | 1.3 |
| A-4 | 2.0 | 1.0 | 13.0 | 1.5 |
| A-5 | 6.5 | 1.5 | 12.5 | 1.0 |
| A-6 | — | — | — | 1.5 |
| A-7 | 3.7 | 1.4 | 18.7 | 1.1 |

Comparison of Table I with Table II shows that very little crystallization occurred during firing of the glass compositions containing the mill additions according to the present invention but that these compositions were partially crystallized after heat treatment. This is in contrast to the control sample in which considerable amounts of crystals were formed during firing.

We have found that as little as a 1% mill addition of one or more of the enumerated materials will affect crystallization and the effectiveness increases linearly as the percentage of addition is increased. A range of from 3 to 15 percent has been found to be suitable for most applications. Additions in excess of 15 percent may be made, but excessive additions may entirely prevent crystallization.

The exact amount of additive to be used in particular application will also vary with the particle size of the frit and the particle size of the additive. Increasing the surface area of the frit particles by fine grinding tends to increase the tendency to crystallize, while increasing the area of the additive increases its effect as a crystallization inhibitor.

This invention thus accomplishes its stated objects. As a result of the described process, premature crystallization of devitrifiable coatings is inhibited without adversely affecting the coatings or the metal substrates upon which they are fired. Furthermore, this inhibition is effected in such a manner that after the glass has been fired, the enameller may proceed to crystallize in situ in the same manner as he would a coating that had not been subjected to the mill additions disclosed herein.

The addition of crystalline refractory materials as taught by this invention is not to be confused with the known techniques for promoting crystal formation by "seeding." In the latter techniques, the formation of crystals is promoted by the addition of small crystals that act as sites for the growth of desired crystals. In contrast the refractory materials that are added in accordance with this invention do not act as sites for growth, but growth of a given crystal occurs as an indirect result of the inhibition of growth of another crystal.

As illustrated in the specific examples, by varying the amount and specie of material added during the mill addition, the enameller may also control the amount and specie of crystal obtained in the final sample.

While we have shown and described the present invention in connection with a particular crystallizable glass, it should be understood that this method may be used to retard surface nucleation, which is a phenomenon common to all crystallizable glasses, in any crystallizable glass. Various other changes and modifications to the specific embodiments disclosed above may be made by those skilled in the art without departing from the scope of our invention as set forth in the appended claims.

I claim:

1. A method for forming a semi-crystalline vitreous enamel coating on a metallic substrate, wherein crystallization is inhibited, which comprises the following steps:
   a. forming a crystallizable amorphous glass frit,
   b. adding 1-15% by weight of a crystalline refractory material selected from the group consisting of $SiO_2$, $Cr_2O_3$, $Al_2O_3$, $ZrO_2$, $ZrSiO_4$, $TiO_2$, $Li_2O \cdot TiO_2 \cdot SiO_2$, $Sb_2O_3$, $Ta_2O_5$, $WO_3$, $La_2O_5$, and $Fe_3O_4$ to said frit to form a frit-crystalline refractory material mixture;
   c. milling said mixture;
   d. applying said mixture to the surface of said substrate to form a coating;
   e. heating said coating to the fusion temperature of said frit and below the deformation temperature of said substrate to form an amorphous coating having said crystalline refractory material therein; and
   f. heat treating said coated substrate at a temperature below said fusion temperature to crystallize partially said fused amorphous coating and form a coating containing the crystals of said refractory material and crystals formed in situ.

2. A method as in claim 1 which comprises adding 3 to 15% by weight of said crystalline refractory material to said frit.

3. A method as in claim 1 wherein said crystalline refractory material is selected from the group consisting of $SiO_2$, $ZrSiO_4$, $ZrO_2$, and $TiO_2$.

4. In a method for forming a partially crystallized vitreous enamel coating on a metal substrate comprising the steps of smelting a crystallizable glass composition, quenching said smelted glass to form a frit, applying said frit to a metallic substrate, fusing said frit and heat treating to crystallize said fused frit; the method of inhibiting crystallization and controlling the character of crystals forming during heat treating by adding 1-15% by weight of a crystalline refractory material selected from the group consisting of $Sio_2$, $Cr_2O_3$, $Al_2O_3$, $ZrO_2$, $ZrSiO_4$, $TiO_2$, $Li_2O \cdot TiO_2 \cdot SiO_2$, $Sb_2O_3$, $Ta_2O_5$, $WO_3$, $La_2O_5$ and $Fe_3O_4$ to said frit and milling said refractory material into said frit prior to application of said frit to said substrate.

* * * * *